United States Patent [19]

Smallwood

[11] Patent Number: 5,630,605

[45] Date of Patent: May 20, 1997

[54] COMBINATION ARTICULATED VEHICLE DAMPING SYSTEM

[76] Inventor: Leonard F. Smallwood, 1501 Katherine, Pecos, Tex. 79772

[21] Appl. No.: 463,984

[22] Filed: Jun. 5, 1995

[51] Int. Cl.$^6$ .................................................... B62D 3/10
[52] U.S. Cl. .......................... 280/432; 188/377; 280/451; 280/784; 296/35.2
[58] Field of Search .................... 280/400, 423.1, 280/432, 433, 446.1, 449, 451, 789, 784; 296/35.2, 189; 188/371, 377

[56] References Cited

U.S. PATENT DOCUMENTS

| | | | |
|---|---|---|---|
| 2,550,632 | 4/1951 | Young et al. | 280/432 |
| 3,633,934 | 1/1972 | Wilfert. | |
| 3,950,011 | 4/1976 | Yamanaka. | |
| 4,723,879 | 2/1988 | Holt | 267/141.1 X |
| 5,011,326 | 4/1991 | Carney, III | 404/6 |

FOREIGN PATENT DOCUMENTS

| | | | |
|---|---|---|---|
| 61-196839 | 9/1986 | Japan | 188/377 |
| 2-203033A | 8/1990 | Japan | 188/377 |

*Primary Examiner*—Brian L. Johnson
*Assistant Examiner*—Victor E. Johnson
*Attorney, Agent, or Firm*—Akard & Griffin

[57] ABSTRACT

A combination articulated vehicle damping system for absorbing the kinetic energy of the trail vehicle during a collision. Affixed to the trail vehicle is a damping material retainers that holds a damping material. The back of the damping material retainer engages the rear end of the damping material. A slider frame is slidably mounted in the damping material retainer and engages the forward end of the damping material. A shearable fastener prevents the slider frame from moving relative to the damping material retainer until subjected to a predetermined force. Secured to the slider frame is the connector for coupling the lead vehicle to the trail vehicle. Once the combination articulated vehicle is subjected to a predetermined force, the shearable fastener breaks allowing the slider frame to move and thereby deform the damping material. The deformation of the damping material absorbs the kinetic energy of the trail vehicle.

8 Claims, 2 Drawing Sheets

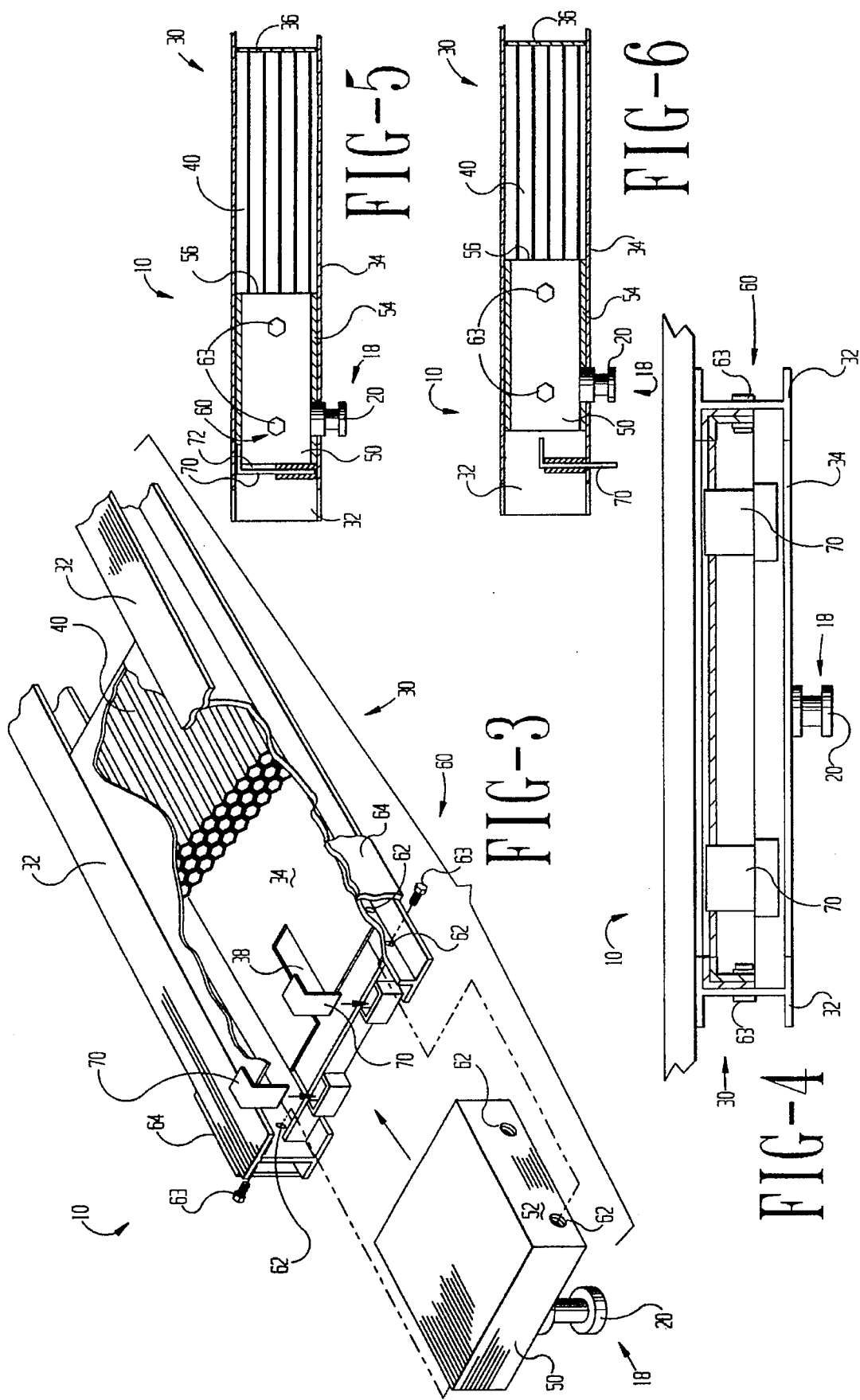

COMBINATION ARTICULATED VEHICLE DAMPING SYSTEM

BACKGROUND OF THE INVENTION

1. Field of Invention

The present invention relates to a safety device for combination articulated vehicles, such as semi-trailer trucks, full-trailer trucks, trains, and subways. More particularly, the present invention relates to a damping system placed between the lead and trail vehicles in a combination articulated vehicle that is designed to absorb the kinetic energy of the trail vehicle during impact.

Generally, combination articulated vehicles are two or more vehicles attached together to form a chain of vehicles and are used primarily to transport cargo or passengers. One example of a combination articulated vehicle is a semi-trailer truck in which a truck is coupled to a trailer. By attaching an additional trailer to the semi-trailer truck, the combination articulated vehicle becomes a full-trailer truck made up of a chain of three or more vehicles. In like manner, trains and subways are combination articulated vehicles made up of engines and cars coupled together in a chain of vehicles. In order to simplify the discussion, the vehicles in a combination articulated vehicle are taken two at a time and referred to as the lead vehicle and the trail vehicle. As the name suggests, the lead vehicle is the vehicle in front when the combination articulated vehicle is moving in the forward direction (e.g. the truck in a semi-trailer truck). Similarly, the trail vehicle is the towed vehicle in a combination articulated vehicle (e.g. the trailer in a semi-trailer truck). One aspect of all combination articulated vehicles is that they must have a gap between the lead and trail vehicles to permit the combination articulated vehicle to turn.

Accidents involving these vehicles often result in extensive property damage, injury, and loss of life. One reason accidents involving combination articulated vehicles are particularly destructive is due to the substantial weight carried in the trail vehicle. When moving, this increased weight in the trail vehicle greatly increases the total kinetic energy of the combination articulated vehicle. Thus, when a combination articulated vehicle collides with another object, the kinetic energy of the trail vehicle transfers to the lead vehicle thereby increasing the kinetic energy of the collision. The increased kinetic energy subjects the operator of the combination articulated vehicle to great accelerations. Additionally, the increased kinetic energy results in greater collision impact forces causing greater damage. The addition of the increased impact forces endangers both the operator of the combination articulated vehicle and others involved in the collision.

2. Related Art

Combination articulated vehicle damping systems are known to the prior art. Illustrative of such systems is U.S. Pat. No. 3,950,011 that issued to Yamanaka on Apr. 13, 1976. However this system does not provide a truly simple remedy for the problem of absorbing the kinetic energy of a trail vehicle during the collision of a combination articulated vehicle. The system shown in Yamanaka teaches the use of a friction plate between the trailer and truck of a semi-trailer truck combined with plastic deformation of the frame of the truck to provide damping. Also, Yamanaka reveals the use of a metal rod designed to plastically deform and absorb kinetic energy during a collision. Further, Yamanaka shows the use of pneumatic and hydraulic cylinders to absorb the kinetic energy of the trailer.

Although Yamanaka provides a safety damping system for combination articulated vehicles, its application requires destruction of the truck frame by design. The design concentrates the load at a narrow point and, thereby, mandates extensive strength and weight of the truck frame; and the design provides for limited damping travel. In addition, implementation of its damping device requires extensive redesign of both the truck and the trailer and may not yield dependable results if oil or water accumulates on the friction plate. Also, Yamanaka has no application to other combination articulated vehicles such as trains and subways.

A related effort is U.S. Pat. No. 3,633,934 that issued to Wilfert on Jan. 11, 1972. Wilfert teaches the use of a piston to deform an energy dissipating medium held within a cylinder to prevent transmission of collision forces to the passenger compartment of a passenger automobile. While not related to combination articulated vehicles, but to passenger automobiles, Wilfert aids in understanding the present invention.

In view of the known combination articulated vehicle damping system, the present invention represents an improvement to provide a damping system that is easily applied to existing combination articulated vehicles with little modification. Additionally, the present invention provides a low cost, easily installed and maintained damping system that is more efficient than prior efforts. Also, the present invention provides damping without destroying the combination articulated vehicle components, as prior efforts do, thereby allowing for lower cost of repair.

SUMMARY OF THE INVENTION

To achieve such improvements, the present invention employs a damping material retained within a retaining frame that is rigidly attached to a trail vehicle. A slider frame, slidably positioned in the retaining frame, is designed and positioned to deform the damping material as the slider frame moves. To prevent the slider frame from moving during normal operation, a shearable fastening means connects the retaining frame and the slider frame and prevents their relative displacement until exposed to a predetermined force. In addition, a connector means for coupling the trail vehicle to a lead vehicle is affixed to the slider frame. Therefore, when the combination articulated vehicle experiences a collision, the fastening means shear allowing the relative displacement of the lead and trail vehicles. This relative displacement causes the slider frame to deform the damping material which absorbs the kinetic energy of the trail vehicle.

Accordingly, the objectives of this invention are to provide, inter alia, a combination articulated vehicle damping system that:

1. absorbs the kinetic energy of the trail vehicle during a collision;
2. reduces the risk to lives in an accident;
3. reduces damage to the vehicle, shipped goods, and other vehicles in an accident;
4. provides for low cost repair of the vehicles that results from low impact collisions;
5. provides a passive safety system requiring no action on the part of the vehicle operator;
6. is low cost;
7. is easy to incorporate into new or existing vehicle designs;
8. is light weight;
9. requires little or no maintenance;
10. provides reliable protection;

11. requires no modification to the tractor, fifth wheel assembly, or kingpin;

12. provides for greater energy absorption movement and slower deceleration than prior reference designs;

13. is purely mechanical, thereby, increasing efficiency;

14. mounts on the trailer, or trail vehicle, providing ease of implementation;

15. distributes the load over a wider surface area than prior reference designs; and 16. provides a safer system for transporting hazardous waste and materials.

BRIEF DESCRIPTION OF THE DRAWING

The manner in which these objectives and other desirable characteristics can be obtained is explained in the following description and attached drawings in which:

FIG. 3 is a partial cross-sectional isometric view of the damping system with the slider exploded from the frame.

FIG. 4 is a partial cross-sectional front elevational view of the damping system attached to a trail vehicle.

FIG. 5 is a partial cross-sectional view of the damping system showing the warning tag in its normal position.

FIG. 6 is a partial cross-sectional view of the damping system showing the warning tag in its warning position wherein the shear bolts are deformed.

DESCRIPTION OF THE PREFERRED EMBODIMENT

Figure 1:
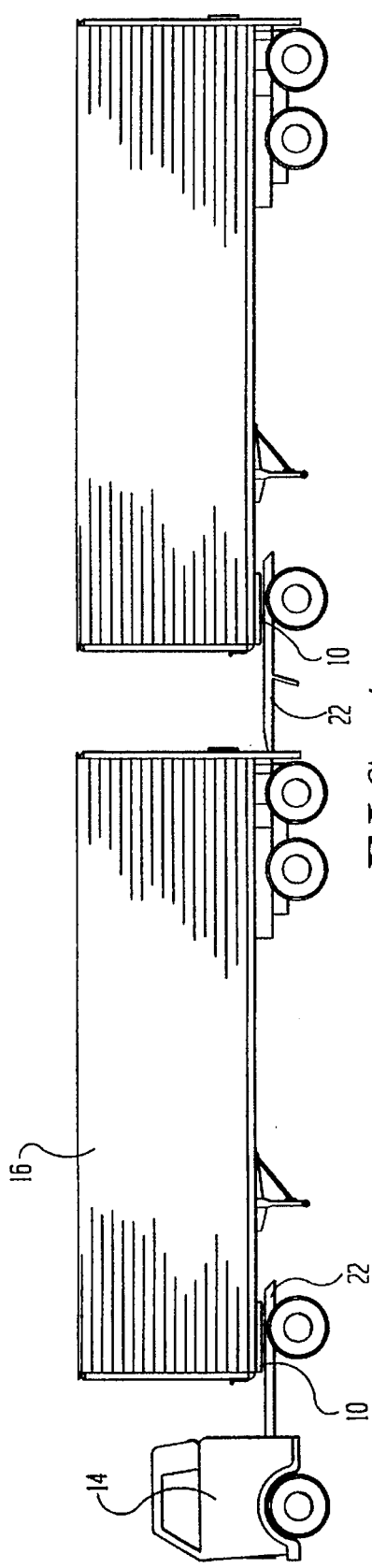
FIG. 1 is a side elevational view of a full-trailer truck incorporating the present invention.
Figure 2:
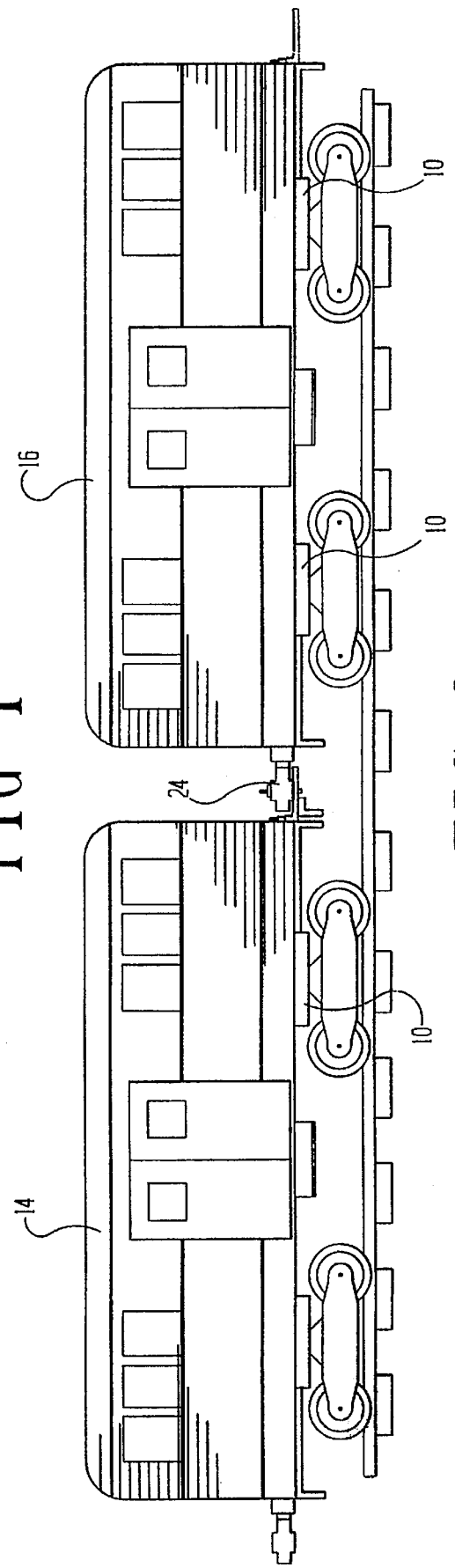
FIG. 2 is a side elevational view of a passenger train incorporating the present invention.

The preferred embodiment of my invention is illustrated in FIGS. 1 through 6 and the combination articulated vehicle damping system is depicted as 10. Basically, the combination articulated vehicle damping system 10 comprises a damping material 40 held within a damping material retaining means 30. This damping material retaining means 30 is attached to a trail vehicle 16. Slidably positioned within the damping material retaining means 30 is a slider frame 50. The slider frame 50 is designed and positioned such that, when it moves relative to the damping material retaining means 30, the slider frame 50 causes the deformation of the damping material 40. Joined to the slider frame 50 is a connector means 18 for coupling the trail vehicle 16 to the lead vehicle 14. A detailed discussion of these components and their operation follows.

Combination Articulated Vehicle.

Articulated vehicles 12, such as semi-trailer trucks, full-trailer trucks, trains, and subways, are comprised of two or more vehicles coupled together to form a chain of vehicles. Considering the vehicles two at a time, one is always in front of the other as the vehicles move in a forward direction. Thus, the one in front may be referred to generally as the lead vehicle 14. Examples of lead vehicles 14 include a truck in a semi-trailer truck, a truck or lead trailer in a full-trailer truck, and an engine or lead car in trains and subways. Similarly, the vehicle directly behind and towed by the lead vehicle 14 may be referred to generally as the trail vehicle 16. Examples of trail vehicles 16 include a trailer in a semi-trailer truck and full-trailer truck and a car in a train or subway. To permit the articulated vehicle 12 to turn, the lead vehicle 14 and trail vehicle 16 are separated by a clearance gap.

As a reference, the trail vehicle 16 has a longitudinal direction that runs from its front to its rear.

A connector means 18 couples the lead vehicle 14 to the trail vehicle 16. In truck and trailer combinations, the connector means 18 comprises a kingpin 20 attached to the trail vehicle 16 that couples with a fifth wheel coupler 22 of the lead vehicle 14. In trains and subways, the lead vehicle 14 connects to the trail vehicle 16 with train couplers 24. To effectuate the objectives of this invention, the damping system 10 is placed at this point of connection between the lead 14 and trail vehicles 16.

Damping Material Retaining Means.

Attached to a forward end of the trail vehicle 16 is a damping material retaining means 30. Basically, the damping material retaining means 30 is a frame for holding a damping material 40 and for guiding a slider frame 50 during its deformation of the damping material 40. Although the damping material retaining means 30 can take many forms, it is preferably comprised of a pair of substantially parallel slider rails 32, a support plate 34, and a back plate The slider rails 32 have a top end secured to the bottom side of the trail vehicle 16. In addition, the slider rails are parallel to the longitudinal direction of the trail vehicle 16.

Adjoined to the bottom end of the slider rails 32 is the support plate 34. A slot 38 in the support plate 34 extends from the forward end of the support plate 34 and runs parallel to the longitudinal direction of the trail vehicle 16. The width of the slot 38 is sufficient to allow the connector means 18 to travel through the slot 38. By allowing the connector means 18 to travel through the support plate 34, the slider frame 50 travels more freely and better facilitates deformation of the damping material 40.

A back plate 36 is affixed to the rear end of the slider rails 32 and lies in a plane perpendicular to the longitudinal direction of the trail vehicle 16. To effectuate deformation of the damping material 40 during a collision the back plate engages and supports the rear end of the damping material 40. Therefore, the back plate 36 is designed to withstand the forces of the damping material 40 during a collision.

As described, the slider rails, support plate 34, and back plate 36 form a frame that is designed to hold and support the damping material 40 during normal operation and during collision.

Damping Material.

As discussed above, the damping material 40 is positioned within the damping material retaining means 30. The damping material 40 has a rear end that engages the back plate 36 of the damping material retaining means 30. Likewise, the damping material 40 has a forward end that engages a back face plate 56 of the slider frame 50. Consequently, as the slider frame 50 moves relative to the damping material retaining means 30 toward the back plate 36, the back plate 36 and the back face plate 56 of the slider frame 50 deform the damping material 40. This deformation of the damping material 40 absorbs kinetic energy.

The material used for the damping material 40 may be any number of materials including, inter alia, foam, aluminum honeycomb, steel, fiberglass, plastic, and corrugated board. Any damping material 40 that has a controlled crush rate is suitable. A damping material 40 that crushes in one direction with no expansion in the other directions is preferred.

The length and amount of the damping material 40, and, thus, the length and size of the damping material retaining means 30 as well as the allowable slider travel, is determined by the clearance gap between the lead 14 and trail vehicles 16. To prevent the trail vehicle 16 from colliding with the lead vehicle 14, the damping material 40 length must be limited to the clearance gap plus the length of the damping material 40 when deformed less a nominal clearance space.

Slider Frame.

Slidably positioned in the damping material retaining means 30 is the slider frame 50 having a forward and rear end. The purpose of the slider frame 50 is to act as a ram and deform the damping material 40 in the damping material retaining means 30 during a collision. Thus, the slider frame 50 is sized and designed to fit in the damping material retaining means 30 and to slide in a longitudinal direction therein. Although the slider frame 50 may take many forms, it preferably is comprised of a pair of side plates 52, a bottom plate 54, and a back face plate 56.

The side plates 52 have a top end, a bottom end, a forward end, and a rear end. Further, the side plates 52 are parallel to the longitudinal direction of the trail vehicle 16.

Fastened to the bottom end of the side plates 52 is the bottom plate 54. Though other configurations are possible, the connector means 18 is generally affixed to the bottom plate 54.

Positioned perpendicular to the side plates 52 and secured to their rear end is the back face plate 56. To facilitate deformation of the damping material 40, the back face plate 56 engages the forward end of the damping material 40. For the greatest efficiency, the back face plate 56 is shaped to maximize the contact surface area between it and the damping material 40. Likewise, the back face plate 56 is shaped to fit within the damping material retaining means 30 with only a small amount of clearance. For example, the figures disclose a damping material retaining means 30 with a rectangular inner chamber cross-section. Therefore, the back face plate 56 has a contact face with a rectangular shape. And, the back face plate 56 fits within the damping material retaining means 30 with only a small amount of clearance to allow the slider frame 50 to slide.

Shearable Fastening Means.

When the articulated vehicle 12 is not experiencing a collision, the shearable fastening means 60 is designed to prevent the relative displacement of the slider frame 50 and the damping material retaining means 30. However, when exposed to a predetermined force, the shearable fastening means 60 permits the relative displacement of the slider frame 50 and the damping material retaining means 30. The preferable material for the shear bolts 63 is titanium because of its high endurance limit to ultimate strength ratio.

Preferably, the shearable fastening means 60 comprises one or more shear bolts 63 positioned through substantially aligned holes 62 in the slider rails 32 and the slider frame 50 side plates 52. These bolts 63 are designed to shear, or break, when exposed to a predetermined impact force.

To prevent the broken pieces of the shear bolts 63 from falling into and damaging the wheels, bearings, or other combination articulated vehicle 12 components, protector plates 64 are attached to the slider rails 32 and positioned proximal to the shear bolts 63. The protector plates 64 are designed to catch or deflect the broken shear bolt pieces.

Shear Bolt Deformation Warning Tag.

Under normal conditions, the shear bolts 63 are sufficiently rigid to resist deformation. However, over time, cyclic loading can cause deformation and weakening of the shear bolts 63. When the shear bolts 63 become deformed, they must be replaced. Therefore, to warn of shear bolt deformation, a shear bolt deformation warning tag 70 is included in the preferred embodiment.

The slider frame 50 forward end is positioned relative to the trail vehicle 16 frame front end to form a gap 72 therebetween. The gap 72 width has a predetermined undeformed gap 72 width that is substantially constant when the shear bolts 63 are not deformed. The shear bolt deformation warning tag 70 is maintained in a vertical position on the slider frame 50 over the gap 72. To prevent the warning tag 70 from falling through the gap 72 under normal operating conditions, the shear bolt deformation warning tag 70 has a thickness that is greater than the predetermined undeformed gap width. However, to warn of deformed shear bolts 63, the shear bolt deformation warning tag 70 has a thickness less than a minimum predetermined deformed gap width. Thus, when the shear bolts 63 deform and the gap 72 widens to the minimum predetermined deformed gap width, the shear bolt deformation warning tag 70 falls through the gap 72 and warns of shear bolt deformation. To prevent the shear bolt deformation warning tag 70 from falling completely through the gap 72, the shear bolt deformation warning tag 70 upper end thickness is great enough to hold the shear bolt deformation warning tag 70 between the slider frame 50 and the trail vehicle 16 frame front end.

Operation.

When the lead or trail vehicle 16 is subjected to an impact force, the shear bolts 63 fail, by design, and allow the slider frame 50 to move relative to the damping material retaining means 30. Because the collision force is applied to the front of the lead vehicle 14 or the rear of the trail vehicle 16, the slider frame back face plate 56 is driven toward the damping material retaining means back plate 36. As these two plates are forced together, they deform the damping material 40 that lies between them. It is the deformation of this damping material 40 that absorbs the kinetic energy of the trail vehicle 16.

While the preferred embodiment of the invention has been disclosed herein, it should be appreciated that modification of the particular embodiment of the invention may be resorted to without departing from the scope of the invention.

I claim:

1. A combination articulated vehicle damping system comprising:
    a. a damping material retaining means attached to a trail vehicle;
    b. a damping material retained in the damping material retaining means;
    c. a slider frame slidably positioned within damping material retaining means;
    d. wherein the slider frame is designed and positioned to deform the damping material as the slider frame moves;
    e. a shearable fastening means for preventing relative displacement of the slider frame and the damping material retaining means until exposed to a predetermined force; and
    f. a connector means attached to the slider frame for connecting the trail vehicle to a lead vehicle.

2. A combination articulated vehicle damping system as claimed in claim 1 wherein the damping material retaining means comprises:
    a. a pair of substantially parallel slider rails each having a top end, a bottom end, a forward end, and a rear end;
    b. wherein the top end of the slider rails are attached to the trail vehicle;
    c. a support plate attached to the bottom end of the slider rails;
    d. a back plate positioned perpendicular to the slide rails and attached to the rear end of the slider rails; and
    e. wherein the back plate engages a rear end of the damping material.

3. A combination articulated vehicle damping system as claimed in claim 2 wherein the slider frame comprises:
   a. a pair of side plates each having a top end, a bottom end, a forward end, and a rear end;
   b. a bottom plate attached to the bottom end of the side plates;
   c. a back face plate positioned perpendicular to the side plates and attached to the rear end of the side plates; and
   d. wherein the back face plate engages a forward end of the damping material.

4. A combination articulated vehicle damping system as claimed in claim 3 wherein the damping material retaining means support plate further comprises:
   a. a slot running parallel to the slider rails;
   b. wherein the connector means is attached to the slider frame bottom plate; and
   c. wherein the slot is sufficiently sized to permit the connector means to travel freely through the support plate slot.

5. A combination articulated vehicle damping system as claimed in claim 4 wherein the shearable fastening means comprises:
   a. at least one shear bolt positioned through substantially aligned holes in the slider rails and the slider frame side plates; and
   b. wherein the shear bolts permit relative displacement of the slider frame and the damping material retaining means when one of the lead and trail vehicle is subjected to a predetermined force.

6. A combination articulated vehicle damping system as claimed in claim 5 wherein the damping material comprises aluminum honeycomb.

7. A combination articulated vehicle damping system as claimed in claim 6 further comprising at least one plate attached to the slider rails proximal to the shear bolts.

8. A combination articulated vehicle damping system as claimed in claim 7 further comprising:
   a. a shear bolt deformation warning tag having an upper end and a lower end;
   b. wherein the trail vehicle has a frame with a front end;
   c. wherein the slider frame, having a forward end, is positioned relative to the trail vehicle frame front end to form a gap between the slider frame forward end and the trail vehicle frame front end;
   d. wherein the gap width has a predetermined undeformed gap width that is substantially constant when the shear bolts are not deformed;
   e. wherein the shear bolt deformation warning tag has a thickness greater than the predetermined undeformed gap width and rests in a vertical position on the slider frame forward end and over the gap;
   f. wherein the shear bolt deformation warning tag has a thickness that allows it to fall through the gap when the shear bolts become deformed; and
   g. wherein the shear bolt deformation warning tag upper end has a greater thickness to prevent the shear bolt deformation warning tag from falling completely through the gap.

* * * * *